Patented Nov. 30, 1926.

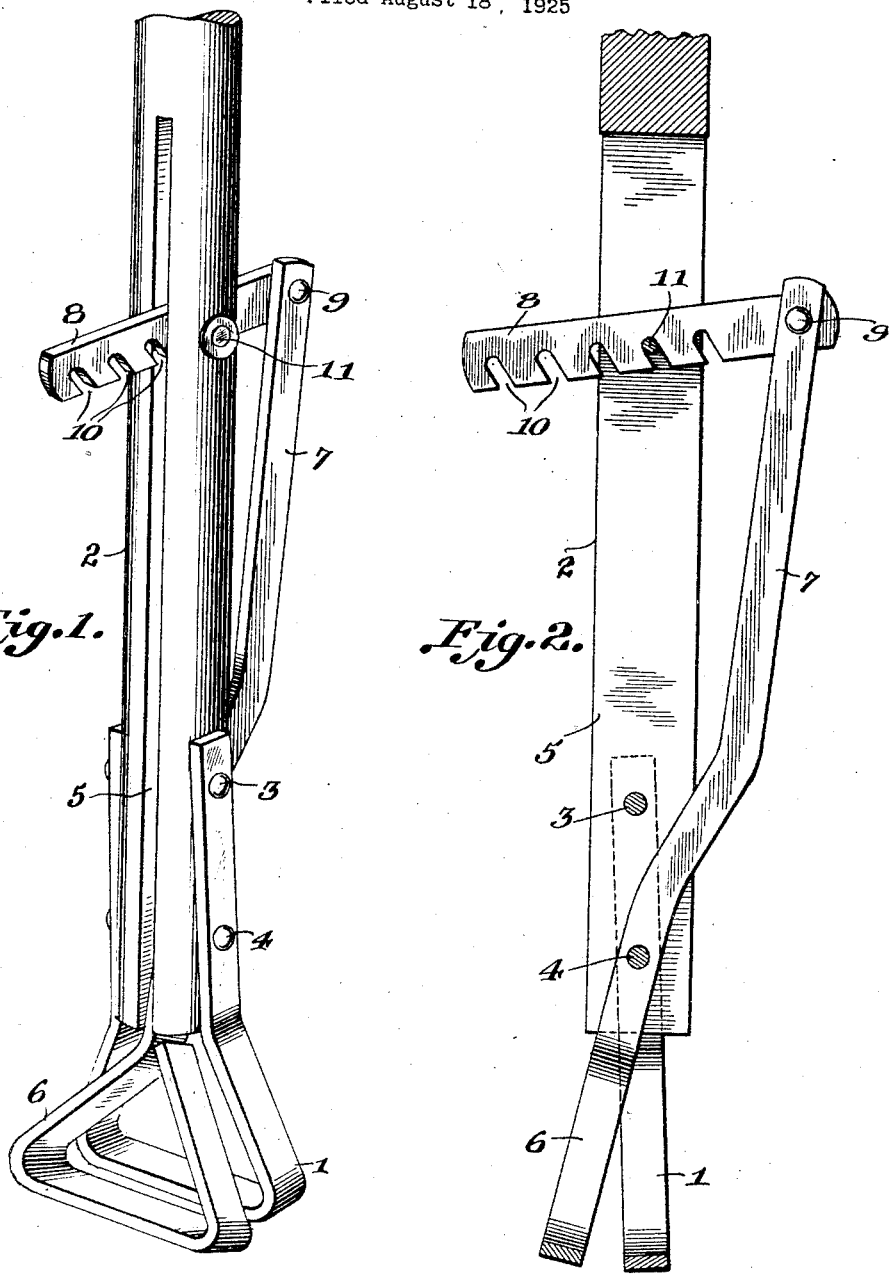

1,608,636

UNITED STATES PATENT OFFICE.

HENRY M. VAN DEUSEN, OF WESTFIELD, MASSACHUSETTS.

MOP HOLDER.

Application filed August 18, 1925. Serial No. 51,031.

My invention relates to new and useful improvements in mop holders. The object of this particular holder is to produce a holder of such simplicity and yet of such efficiency that the householder will obtain an improved article at a low cost.

In the drawings,

Figure 1 is a perspective showing the mop holder in a semi-closed position.

Figure 2 is a vertical section taken through the longitudinal slot in the mop handle, showing the pivoted member and locking feature.

As shown in Figure 1, the invention comprises a fixed U-shaped gripping member 1, which is attached to handle 2 by rivets 3 and 4, the handle 2 having a longitudinal slot 5 in which is pivotally mounted on rivet 4 a gripping member 6 with a handle 7 projecting beyond the slot 5 to connect pivotally at 9 with locking arm 8, locking arm 8 having indents 10 capable of fitting over pin 11 which passes through the mop handle 2, the other end of gripping member 6 taking the form of a gripping jaw.

In Figure 2 is shown the pivoted gripping member 6 exposed at its pivoted connection 4 with its projecting handle 7, pivotally connected at 9 to the locking arm 8. The locking arm 8 being exposed to show the indents 10 in the locking arm, in locked position with the pin 11. The fixed U-shaped gripping member 1 is shown attached to mop handle 2 in outline by broken lines.

Briefly stated, the mop is used as follows: A mop or cloth is placed across the fixed U-shaped member 1, and is held in place by the pivoted member 6 bearing against the fixed member. This is brought about by pressure exerted against the arm of the pivoted member which projects beyond the pivoted point parallel to the mop handle. Upon the mop or cloth being firmly held between the two gripping members, the pivoted member is locked in position by the arm 8 pivotally connected to the member 7 at its extremity furthest from the gripping member thereof, the arm 8 having spaced indents adapted to seat over the pin 11 passing through the handle to lock the pivoted gripping member at the desired point.

What I claim is:—

1. A mop holder comprising a handle having a longitudinal slot, a substantially U-shaped member having its legs extending along the handle on the opposite sides of the slot, and its head positioned beyond the end of the handle to constitute a gripping member, a lever positioned through the slot and provided on one end with a gripping member adapted to co-operate with the first mentioned gripping part, a fastening member fastening through the legs of the U-shaped member, the said fastening member constituting a pivot in the U-shaped member for the gripping member and ratchet means for securing the lever in desired position with respect to the handle.

2. A mop holder comprising a handle having a slot extending lengthwise through one end thereof, a grip member fixed to said handle and extending across the slotted end thereof, a lever pivoted intermediate its end in said slot and having the end of one of its arms formed as a gripping member to co-operate with the first named gripping member, a locking bar provided with notches and pivoted to the other end of said lever, and means in said slot adapted to engage any of the notches in said bar to lock said lever in any desired position.

3. A mop holder comprising a handle, a U-shaped gripping member having the legs thereof fixed to one end of said handle, a lever pivoted intermediate its ends in said handle and having one of said ends formed as a gripping member, and a bolt passing through the legs of U-shaped gripping member through the handle and through said lever to lock the gripping member in position on said handle and to serve as a fulcrum for said lever.

In testimony whereof I affix my signature.

HENRY M. VAN DEUSEN.